(12) United States Patent
Sanger et al.

(10) Patent No.: US 7,253,924 B2
(45) Date of Patent: Aug. 7, 2007

(54) METHOD OF IMAGING MULTIPLE BINARY BITMAPS IN A SINGLE PASS

(75) Inventors: Kurt M. Sanger, Rochester, NY (US); Seung Ho Baek, Pittsford, NY (US); Thomas A. Mackin, Hamlin, NY (US)

(73) Assignee: Eastman Kodak Company, Rochester, NY (US)

( * ) Notice: Subject to any disclaimer, the term of this patent is extended or adjusted under 35 U.S.C. 154(b) by 966 days.

(21) Appl. No.: 10/355,849

(22) Filed: Jan. 31, 2003

(65) Prior Publication Data

US 2004/0150843 A1   Aug. 5, 2004

(51) Int. Cl.
  *H04N 1/60* (2006.01)
(52) U.S. Cl. .................. 358/1.9; 358/1.7; 358/3.01; 358/3.21; 358/501; 358/3.24; 358/3.26; 358/504; 358/530; 347/232; 347/252; 347/144
(58) Field of Classification Search .............. 358/1.7, 358/1.9, 3.01, 3.21, 3.24, 3.26, 501, 504, 358/530, 518–521, 540; 347/232, 252, 144
See application file for complete search history.

(56) References Cited

U.S. PATENT DOCUMENTS

| 5,091,967 | A | * | 2/1992 | Ohsawa ................ 382/172 |
|---|---|---|---|---|
| 5,260,799 | A | * | 11/1993 | Loce et al. ............... 358/300 |
| 5,268,708 | A | | 12/1993 | Harshbarger et al. ....... 346/134 |
| 5,309,246 | A | | 5/1994 | Barry et al. ............... 358/298 |
| 6,060,208 | A | | 5/2000 | Wang ....................... 430/201 |
| 6,483,607 | B1 | * | 11/2002 | Van de Capelle et al. ... 358/1.9 |
| 2004/0085553 | A1 | * | 5/2004 | Couwenhoven et al. ..... 358/1.9 |

* cited by examiner

*Primary Examiner*—Twyler Lamb
*Assistant Examiner*—Steven Kau
(74) *Attorney, Agent, or Firm*—Nelson Adrian Blish (57) ABSTRACT

A method for printing multiple binary bitmaps (10) with an original density level (12a) and a color (18), wherein the color (18) is the same for all the multiple binary bitmaps (10), by combining "n" number of binary bitmaps into "p" bits of a multibit image forming a "p" bit image (20), identifying at least one overprint (24a), predicting an overprint density (26a) for each overprint, calculating a set of exposures (28) needed to image each overprint density (24a) and original density (12a), setting a maximum exposure level (30) that is a number greater than or equal to the maximum of the set of exposures (28), calculating pulse width modulation levels (30) for the set of exposures (28) using the set maximum exposure level (30), and printing the color (28) at the set maximum exposure level (30) using the pulse width modulation levels (30) for each level of the "p" bit image (20) in a single pass.

27 Claims, 5 Drawing Sheets

METHOD OF IMAGING MULTIPLE BINARY BITMAPS IN A SINGLE PASS

CROSS REFERENCE TO RELATED APPLICATIONS

Reference is made to commonly-assigned copending U.S. patent application Ser. No. 10/356,006, filed Jan. 31, 2003, entitled METHOD FOR PRINTING A COLOR PROOF USING A SPATIAL FILTER, by Kurt M. Sanger; U.S. patent application Ser. No. 10/355,600 (now U.S. Pat. No. 6,893,105), filed Jan. 31, 2003, entitled A METHOD FOR PRINTING AN IMAGE FROM A HALFTONE BINARY BITMAP USING MULTIPLE EXPOSURES, by Sanger et al.; U.S. patent application Ser. No. 10/355,372, filed Jan. 31, 2003, entitled METHOD OF ADJUSTING COLOR IN A COLOR PROOF, by Sanger et al.; and U.S. patent application Ser. No. 10/355,932, filed Jan. 31, 2003, entitled APPARATUS FOR PRINTING A MULTIBIT IMAGE, by Sanger et al., the disclosures of which are incorporated herein.

FIELD OF THE INVENTION

The present invention relates to a method for printing halftone color proofs from binary bitmap images and more specifically for combining multiple binary bitmaps of the same color at different density levels and printing them in a single pass.

BACKGROUND OF THE INVENTION

Pre-press color proofing is a procedure used by the printing industry to create representative images of printed material. This procedure avoids the high cost and time required to produce printing plates and set-up a high-speed, high-volume printing press to produce a single intended image for proofing prior to a production run of the intended image. In the absence of pre-press proofing, a production run may require several corrections to the intended image to satisfy customer requirements, and each of the intended images would require a new set of printing plates. By utilizing pre-press color proofing, time and money are saved.

A laser thermal printer having halftone color proofing capabilities is disclosed in commonly assigned U.S. Pat. No. 5,268,708 (Harshbarger, et al.). The U.S. Pat. No. 5,268,708 device is capable of forming an image on a sheet of thermal print media by transferring dye from dye donor material to thermal print media. This is achieved by applying thermal energy to the dye donor material to form an image on the thermal print media. The apparatus disclosed comprises a material supply assembly; a lathe bed scanning subsystem, which includes a lathe bed scanning frame, a translation drive, a translation stage member, and a laser printhead; a rotatable vacuum imaging drum; and exit transports for the thermal print media and dye donor material.

The U.S. Pat. No. 5,268,708 apparatus meters a length of the thermal print media in roll form from a material supply assembly. The thermal print media is measured and cut into sheets of the required length, transported to the vacuum imaging drum, and wrapped around and secured to the vacuum imaging drum. Donor roll material is metered out of the material supply assembly, measured, and cut into sheets of the required length. A sheet of dye donor material is transported to and wrapped around the vacuum imaging drum, and superposed in registration with the thermal print media. The scanning subsystem traverses the printhead axially along the rotating vacuum imaging drum to produce the image on the thermal print media. The image is written in a single swath, traced out in a continuous spiral, concentric with the imaging drum, as the printhead is moved parallel to the drum axis.

The U.S. Pat. No. 5,268,708 apparatus simulates the printing process by imaging the dye donor material at a constant exposure. The dye donor is used to mark or not mark the thermal print media similar to the printing process, which either transfers or does not transfer ink. The apparatus allows the exposure to each dye donor material to be varied over a limited range to allow the customer to match the density of the of the dye deposited on the thermal print media with the density of the ink which will be used to print the image on a press.

Color proofers create halftone bitmaps of cyan, magenta, yellow, and black color planes using a raster image processor (RIP). Customer artwork is composed into pages using software such as Quark Express™ or Adobe InDesign™. These pages may consist of color images, black and white images, artwork, linework, and text. Images may be continuous tone, multilevel, or binary. The pages may also contain PDF or PostScript codes. The RIP processes the input pages and creates halftone bitmap files for each color plane at the writing resolution of the printer. The RIP converts multilevel input, such as the pixels in a continues tone image, into halftone dots of the appropriate size.

Although the printer disclosed in U.S. Pat. No. 5,268,708 performs well, there is a long-felt need to be able to use colors other than the standard cyan, magenta, yellow, and black (CMYK) in pre-press color proofing. The CMYK colors are often referred to as process colors. In the printing industry additional colors, other than cyan, magenta, and yellow, are used depending upon the graphic designers intentions for the printed work. A "key" color may be added to highlight a particular component of the artwork. For screened continuous tone images this key color is typically chosen to be black. The image is modified to use black to adjust the intensity level within the image instead of using cyan, magenta, and yellow together. This is called under color removal. For some work, the customer may choose to use another color, for example, brown, as the key color. This may be appropriate, for example, on a cereal box or in an image with a tan subject. To print the job the printer uses cyan, magenta, yellow and the key color. To save money one or more of the colors may be eliminated. For artwork the printing industry may print the job with the exact inks used by the artist. In these cases the printer may be printing red, blue, or some combination of colors which may or may not include CMYK.

In many cases the color of the subject may not be successfully reproduced using the standard CMYK colorants. In this case an additional color printing plate may be created to be printed with an ink which is a close match to the desired color of the subject. This additional color is imaged with the CMYK layers and is called a "bump" plate. It is important to note that one or more of the process colors may be eliminated or replaced with the bump color. For instance if a red color is used to bump the color of a red car, then the black or cyan process color may be replaced with the red bump color.

In existing pre-press systems, additional donor colors would be needed to accomplish this. For example, commercial systems such as Polaroid Graphics Imaging Polaproof, Dupont Digital Halftone Proofing System, and Imation Matchprint Laser Proof Technology, have all advertised the availability of additional donor colorants to create digital halftone proofs with special colors. This solution, however, requires the manufacturer to produce additional dye donor sheet in special color, often in small volume. Small production runs like this, for one color, are expensive.

Another problem arises when plates in the printing press are out of register. In that case colors are imaged slightly wider and overlapped so that a white space error does not occur. The printing industry hides this defect by increasing the line width of a color such that errors in color placement are hidden behind the darker color. This technique is called "trapping." It is important to be able to see the trapping on each of the printed color planes in the halftone proof. The capability to show trapping is not readily available in state of the art pre-press color proofers without use of a special color dye donor sheet.

Printing presses traditionally uses a halftone screen to generate a tone scale. The printing process is only capable of delivering or not delivering ink, which is usually opaque. This is the binary printing process. To generate a light tint, small dots of ink are used. To generate a darker tint the ink dots are enlarged which touch and fill the space between dots. The halftone proofer disclosed in U.S. Pat. No. 5,268,708 images CMYK colorants at a high resolution. For example, a Kodak Approval XP system produces images in either 2400 dpi or 2540 dpi using a software raster image processor (RIP) to generate a bitmap which determines when the lasers within the printer mark the CMYK films. The colors are arranged in a grid and the pitch, dot to dot, is called the screen ruling in dots per inch. The angle of the grid is called the screen angle. Each color is printed at a different screen angle to hide the beating, or aliasing, caused by the alignment and accuracy of the color screens to each other. For optimum conditions the cyan, magenta, and black screens are each separated by 30 degrees. The fourth color, yellow, is then placed at an angle half way between the angle of two of the other colors. Each color screen is separated out as a separate bitmap plane with a grid of pixels at the writing resolution of the digital halftone proofer. The software RIP determines the positions in the grid when the laser needs to be energized to print the halftone dot.

It is common practice in color proofing to represent special color planes, i.e. planes containing colors other than the processes colors, by replacing solid color areas with halftone patterns of the process colors as described for example in U.S. Pat. No. 5,309,246 (Barry et al.). It is usually necessary to attach additional instructions with these proofs to inform customers and printers that a substitution has been made. It is highly desirable for halftone color proofing systems to reproduce the special color planes with colors that more closely represent the final print job. In the case of laser thermal material transfer proofing systems it is well known that this can be accomplished by using individualized donors having the unique color required for the special color plane, however, this process adds additional expense as described above.

U.S. Pat. No. 5,309,246 generates special colors using separate screens of the primary components of the special color. These screens consists of halftone dots of different sizes in each of the primary colors to compose a "recipe" color and simulate the special color required in the proof. If the halftone screens of the recipe color are designed to run at a constant density of the primary color then they may be combined and run in one pass. Trapping would not be shown if they run in a single pass. The special color is obtained by modulated density using halftone dot size so that the halftone dot size of the written special color will not match the press. The advantage of U.S. Pat. No. 5,309,246 is that the halftone special color is a good approximation of the special color. The disadvantage of U.S. Pat. No. 5,309,246 is that an additional exposure pass is required for each component of the special color.

U.S. Pat. No. 6,060,208 (Wang) simulates the special color by screening the special color, then modifying the screened bitmap by eliminating pixels so that when the modified bitmap is imaged with the printer's primary color less density is printed and the resulting proof looks like it has been imaged with an additional special colorant. The method in U.S. Pat. No. 6,060,208 also produces a halftone image of the special color. However, the method in U.S. Pat. No. 6,060,208 has noticeable holes within the special color halftone dots on the proof. For cases where a small amount of pixels are subtracted or a few number of pixels are added, the method in U.S. Pat. No. 6,060,208 is similar to U.S. Pat. No. 5,309,246. With the method in U.S. Pat. No. 6,060,208 the special color bitmap may be combined with the primary color bitmap so that the primary color is imaged in a single pass. However, the exposure for this pass is a constant, and the density transferred per micro-pixel is also a constant. If the printer resolution is high enough to see each individual micro-pixel in the image then the method in U.S. Pat. No. 6,060,208 is visible in the halftone proof. If the printer resolution is lower than the writing resolution then the missing or additional micro-pixels are blurred in the image and the method in U.S. Pat. No. 6,060,208 is modulating the density in the halftone proof identical to U.S. Pat. No. 5,309,246. When a few micro-pixels are added or subtracted from the primary color then the method in U.S. Pat. No. 6,060,208 produces pleasing results. However, when a small amount of primary color is required then using a few micro-pixels at a fixed density does a poor job creating a halftone screen of the special color. This is described by U.S. Pat. No. 5,309,246 as adding a small halftone dot of one color to a larger halftone dot of a second color to achieve a third color.

Commonly-assigned U.S. patent application Ser. No. 09/535,671, filed Mar. 23, 2000 describes a method of imaging a special color using multiple primary colors at unique exposures to mix different amounts of primary colors on the halftone proof. U.S. patent application Ser. No. 09/535,671 uses a single binary bitmap for each of the colors in the special color. The disadvantage of U.S. patent application Ser. No. 09/535,671 is that an additional exposure pass is required for imaging each additional colorant within the special color.

Color proofers may use both laser power and drum speed to adjust the exposure for each colorant. A drum speed increment of 25 RPM allows running close to the maximum laser power most of the time thereby increasing print throughput. Color proofers image one bitmap at one exposure per pass. The high writing resolution and the small spot size, approximately 25 um, are used to simulate center weighted halftone dots and text that are normally imaged on a printing press. Printing special colors using multiple exposures of the primary colors requires additional exposures passes. These extra passes take more time and lower the throughput of the digital halftone proofer.

SUMMARY OF THE INVENTION

Briefly, according to one aspect of the present a method for printing multiple binary bitmaps with an original density level and a color, wherein the color is the same for all the multiple binary bitmaps, by combining "n" number of binary bitmaps into "p" bits of a multibit image forming a "p" bit image, identifying at least one overprint, predicting an overprint density for each overprint, calculating a set of exposures needed to image each overprint density and original density, setting a maximum exposure level that is a number greater than or equal to the maximum of the set of exposures, calculating pulse width modulation levels for the set of exposures using the set maximum exposure level, and printing the color at the set maximum exposure level using the pulse width modulation levels for each level of the "p" bit image in a single pass.

DETAILED DESCRIPTION OF THE INVENTION

The invention has been described in detail with particular reference to certain preferred embodiments thereof, but it will be understood that variations and modifications can be effected within the spirit and scope of the invention. For the sake of discussion, but not limitation, the preferred embodiment of the present invention will be illustrated in relation to a laminating apparatus for making pre-press proofs. Referring to the drawings wherein like reference numerals represent identical or corresponding parts throughout the several views.

Figure 1:
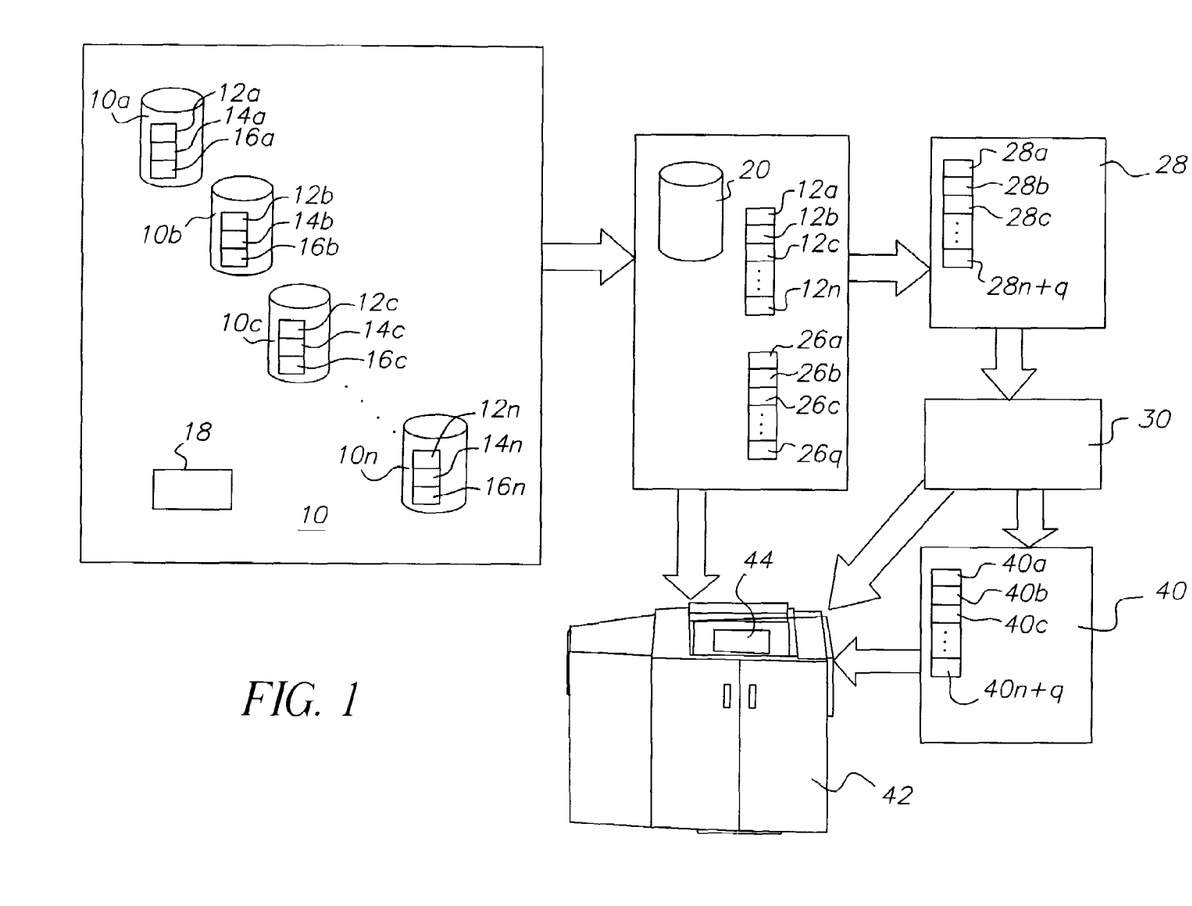
FIG. 1 is a block diagram of the invention.

Referring to FIG. 1 the invention is a method for printing multiple binary bitmaps 10a, 10b, 10c, 10n with an original density level 12a, 12b, 12c, 12n, screen ruling 14a, 14b, 14c, 14n, screen angle 16a, 16b, 16c, 16n, and a color 18. In the preferred embodiment, the color is the same for all the multiple binary bitmaps.

The method begins by combining "n" number of binary bitmaps into "p" bits of a multibit image forming a "p" bit image 20 and identifying at least one overprint 24a. The user, next, predicts an overprint density 26a, 26b, 26c, etc. for each overprint. The prediction aids the user in calculating a set of exposures 28 needed to image each overprint density 26a, 26b, 26c, etc. and original density 12a, 12b, 12c. The original density level for each bitmap can be one of the following: one level different, all levels different, all levels the same, a portion of the levels the same, a portion of the levels different, or combinations thereof.

The method continues by setting a maximum exposure level 30. The maximum exposure level 30 is a number greater than or equal to the maximum of the set of exposures 28. The pulse width modulation level 40 can then be calculated for the set of exposures 28 using the set maximum exposure level 30.

The method ends by printing the color 18 at the set maximum exposure level 30 using the pulse width modulation levels 40 for each level of the "p" bit image 20 in a single pass on printer 42 resulting in proof 44. The method may be repeated for each primary color available in the printer.

The printer 42 may be of the type described in U.S. patent application Ser. No. 10/355,932, filed Jan. 31, 2003, entitled APPARATUS FOR PRINTING A MULTIBIT IMAGE, by Sanger et al.

Figure 2:
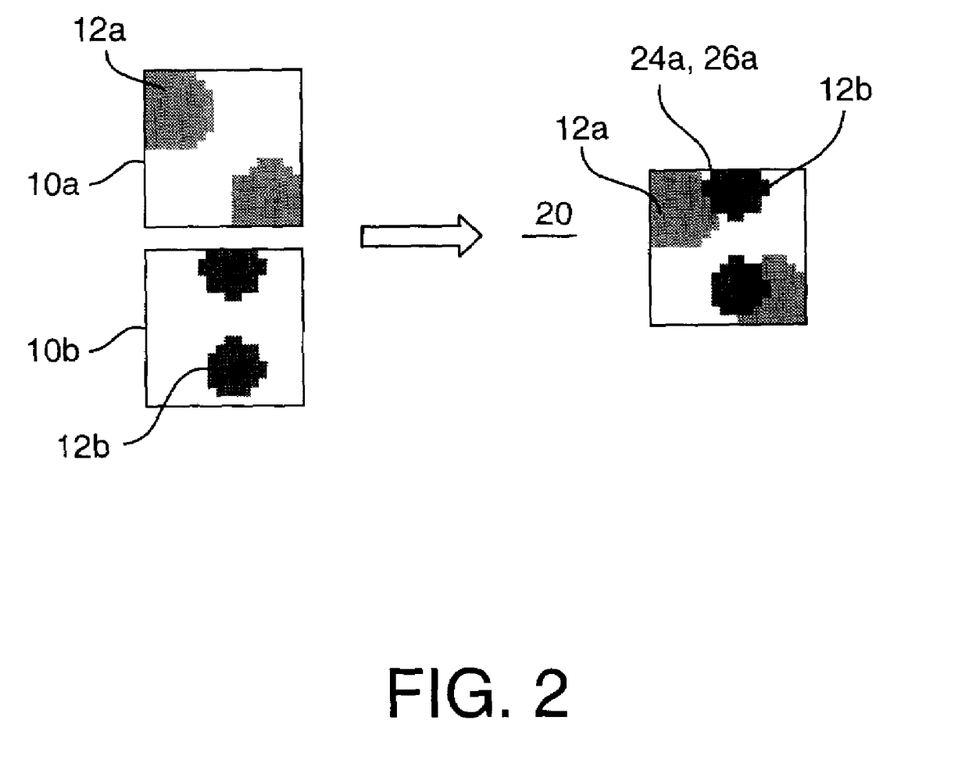
FIG. 2 is an example of two original binary bitmaps being combined into one "p" bit image.

FIG. 2 shows a simple case of a binary bitmap 10a having a single grayscale level which represents the density level 12a. A second binary bitmap 10b having a second grayscale level which represents a second density level 12b is combined with the first binary bitmap 10a into a "p" bit image 20. Here "p" is equal to 2. Bit zero of the "p" bit image 20 corresponds to the binary bitmap 10a while bit one of the "p" bit image 20 corresponds to the binary bitmap 10b. When both bit zero and bit one are on then binary bitmap 10a and binary bitmap 10b overprint each other creating overprint area 24a. This overprint area has an associated overprint density 26a shown as a third grayscale level in FIG. 2.

In the simplest embodiment "p"="n" and each bit within a pixel in the "p" bit image 20 corresponds to one of the "n" binary bitmaps 10. In the simplest case there are $2^n-n-1$ overprints. The method can further involve identifying the overprints by identifying that more than one bit of the "p" bit image is "on" within the same pixel.

The overprint density 26a, 26b, 26c may be estimated using various methods. In one method 110% of the darker of original density 12a or 12b is used to estimate the overprint density for the overprint area of binary bitmap 10a and 10b. Where the overprint consists of three bitmaps then 115% of the darker density is used. When the overprint consists of four bitmaps then 120% of the darker density is used. This may be repeated for an overprint of "n" bitmaps resulting in (100+5×n) % of the darkest density used to estimate the overprint density. The advantage of this method is that it guarantees that the overprint area will be printed darker than either of the components contributing to its area. Another advantage is that the overhead to image the darkest density is relatively small resulting in a fast printing process. The disadvantage is that this method may not be an accurate portrayal of the printing process.

Another method to estimate the overprint density 26a, 26b, 26c is to add a percentage of the second original density level 12b to the first original density level 12a. This method is similar to the method known as the Preucil Trapping Formula, (Stanton, INK TRAPPING AND COLORIMETRIC VARIATION, GATF Press, 2001), to estimate trapping between different color inks on press. Typical trap levels on press are 70% to 100%. An overprint density composed of three colors would use a percentage of the third original density level 12c plus a percentage of the second original density level 12b plus the first original density level 12a. This method may be expanded to handle "n" density levels in a given order. This method's advantage is that the Preucil Trapping Formula is known in the industry as a method of measuring inter-color trapping. The difference is in applying the Preucil Trapping Formula within a single primary color. A disadvantage is that the percentages used are relatively high requiring darker overprints, more exposure, and increased printing times.

Figure 5:
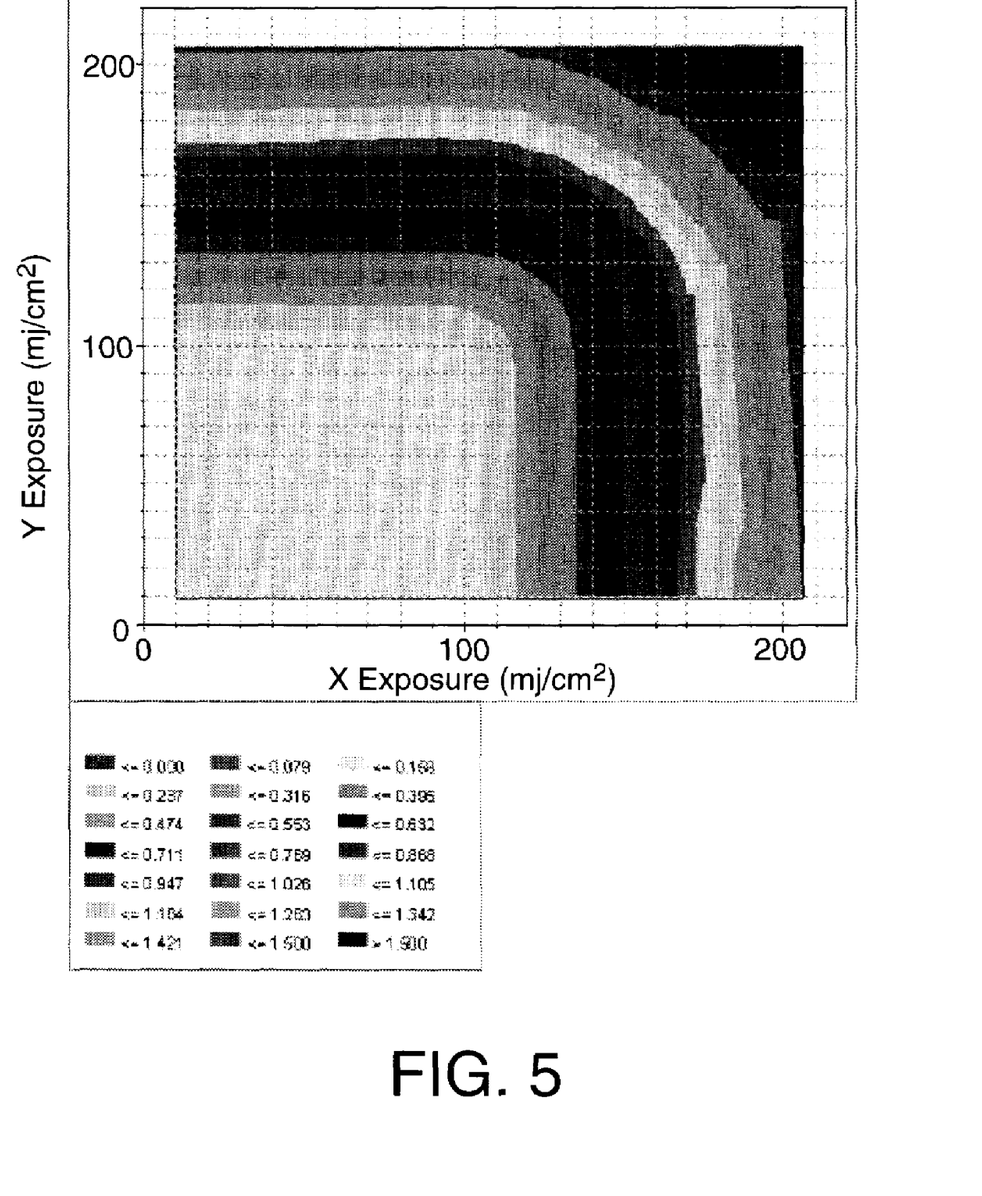
FIG. 5 shows the overprint density as a function of a first x exposure and a second y exposure using the cyan donor on a Kodak Approval XP4 Direct Digital Color Proofer.

A third method to estimate overprint density 26a, 26b, 26c is to print and measure variable amounts of a second density on top of variable amounts of a first density and fit a model to the measured overprint density as a function of the first and second densities. FIG. 5 shows the overprint density as a function of a first x exposure and a second y exposure using the cyan donor on a direct digital color proofer. This method may also be used to estimate the overprint densities of a printing press.

A fourth method is to ignore the overprint density and set the density level to the darker of the components. This method may not accurately predict the press performance unless the "n" bitmaps do not overlap. This method also results in no added density requirements and would require no additional exposure or printing time.

The invention is also a method for printing multiple binary bitmaps 10 with an original density level 12a, 12b, 12c and a color 18. The method envisions that the color is the same for all the multiple binary bitmaps.

This method begins by combining "n" number of binary bitmaps into "p" bits of a multi-bit image forming a "p" bit image 20 and calculating a set of exposures 28 needed to image each original density 12. The method continues by setting a maximum exposure level 30 that is a number greater than or equal to the maximum of the set of exposures 28.

The pulse width modulation levels 40 are then calculated for the set of exposures 28 using the set maximum exposure level 30. Finally, the method ends by printing the color 18 at the set maximum exposure level 30 using the pulse width modulation levels 40 for each level of the "p" bit image 20 in a single pass.

The invention contemplates that "p" ranges between two and four. If "n" is greater than "p" the method then includes the step of repeating the method steps using sequential sets of "p" bitmaps at a time until all of the "n" multiple binary bitmaps are printed.

In an alternative embodiment when "n" is greater than "p" then the original densities 12a, 12b, 12c, 12n and the $2^n-n-1$ overprint densities 26a, 26b, 26c are calculated and quantized to $2^p-1$ levels. The set of exposures 28 is adjusted to obtain the quantized $2^p-1$ density levels. The multiple binary bitmaps 10 are then simultaneously read on a pixel by pixel basis and the corresponding "p" bit pixel is recorded into the "p" bit image 20.

Figure 3:
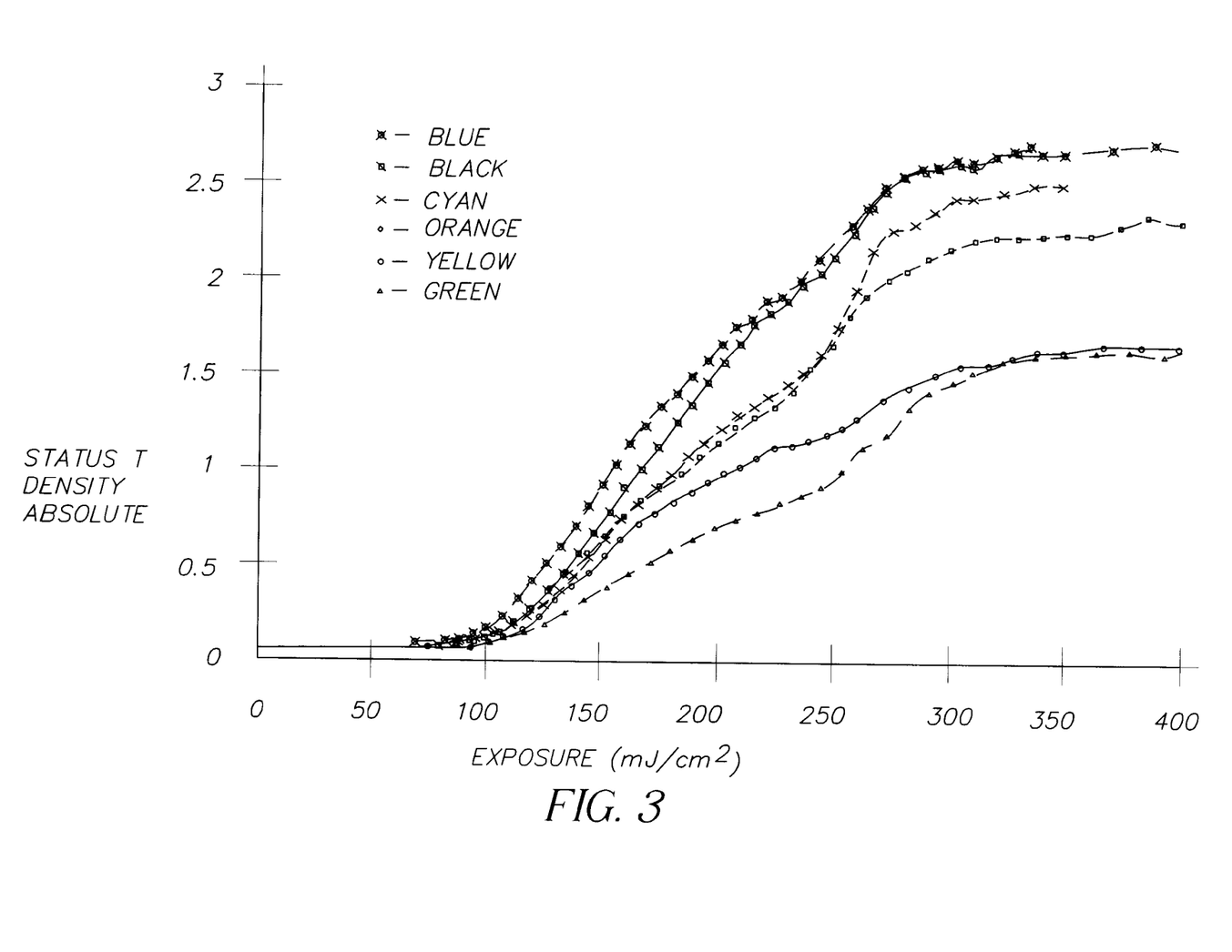
FIG. 3 is an example sensitometric response curve showing density as a function of exposure for multiple primary printer colors.

Since calculations are involved in the method, the invention contemplates that the calculated exposure can be calculated using a curve of density versus exposure, as shown in FIG. 3. The maximum exposure level 30 can range from 50 mJ/cm² to 1000 mJ/cm². The pulse width modulation level is calculated by dividing each exposure in the set of exposures by the maximum exposure level 30. Each pulse width modulation level represents the fraction of the maximum exposure needed to obtain one exposure from the list of exposures. The pulse width modulation level may be implemented in printer 42 by turning the pixel within the "p" bit image on for a percentage of a whole pixel time. Nominally to obtain a pulse width modulation level of 50% the pixel would be turned on for ½ of the pixel time. Pixel time is the time devoted to image a single pixel in the "p" bit image.

For a printer 42 with media mounted to a drum with a circumference "C" revolving at a drum speed "S" and writing resolution "R" the pixel time 46 is calculated using Equation 1. For example, a printer having a drum with a circumference of 58.75 cm/rev, revolving at a speed of 1800 Rev/min, and a writing resolution of 2540 dots/inch, has a pixel time of {2.54 cm/in×60 sec/min×1E9 nsec/sec/[58.75 cm/rev×1800 rev/min×2540 dpi]}=567.4 nsec. To expose a pixel at a pulse width modulation level of 50% the pixel would be turned on for 283.7 nsec out of 567.4 nsec.

Calculation of Pixel Time​    Equation 1.

$$PixelTime = \frac{1}{Circumference \times WritingResolution \times DrumSpeed}$$

The printer described in U.S. patent application Ser. No. 10/355,932, filed herewith, entitled APPARATUS FOR PRINTING A MULTIBIT IMAGE, by Sanger et al. quantizes the pulse width modulation levels in $\frac{1}{16}^{th}$ pixel time increments. The base duty cycle 50 is the maximum number of $\frac{1}{16}^{th}$ pixel time increments within a pulse width modulation level. To further control the exposure of each pixel in finer increments than $\frac{1}{16}^{th}$ pixel this printer allows the trailing edge of each pulse width modulated pixel to be extended by a trailing edge extension count value, TEE count 52. Each TEE count increment extends the trailing edge of the pulse by a fixed amount called TEE time. TEE increments between 0.5 and 3 sec provide a fine resolution between base duty cycles of $\frac{1}{16}^{th}$ pixels.

Figure 4A:
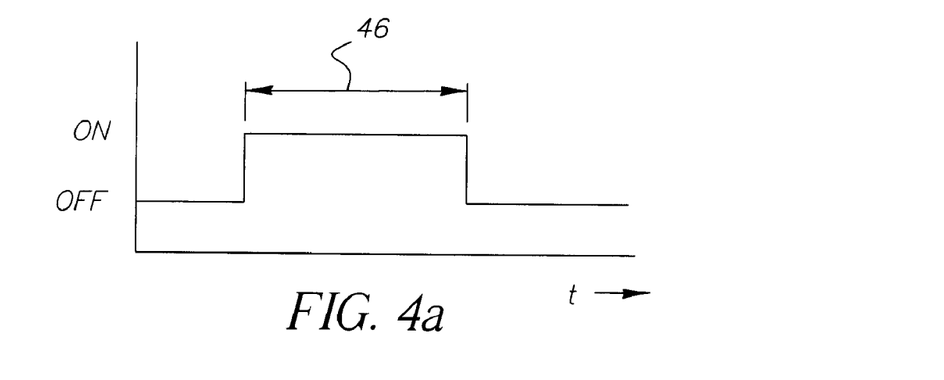
FIG. 4a is an example timing diagram showing one pixel on for one pixel time.
Figure 4B:
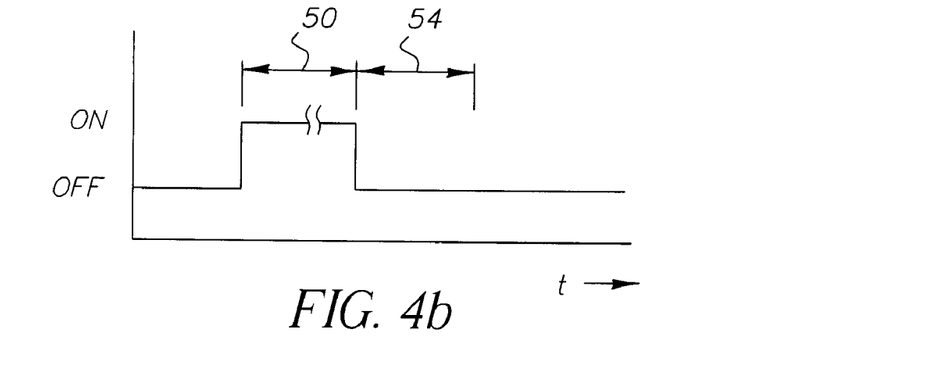
FIG. 4b is an example timing diagram showing one pixel on for less than one pixel time consisting of a base duty cycle and an off time.
Figure 4C:
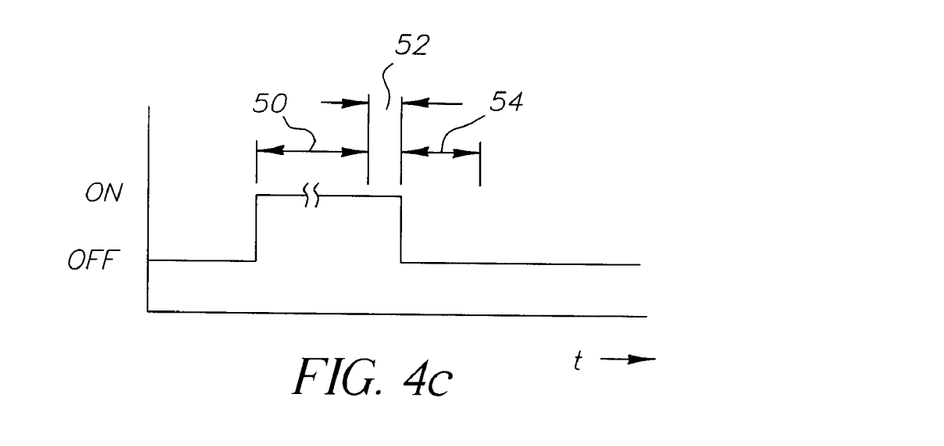
FIG. 4c is an example timing diagram showing one pixel on for less than one pixel time consisting of a base duty cycle, a trailing edge extension count, and an off time.

FIGS. 4a, 4b, and 4c show a series of pulses which representing "on" commands to the printer. FIG. 4a shows one pulse representing the time for a single pixel exposure. FIG. 4b shows one pulse that is on for a base duty cycle 50 which is a multiple of $\frac{1}{16}^{th}$ pixels. FIG. 4c shows the same pulse with the trailing edge extended by a TEE count 52. The pulse width modulation level for the pixel shown in FIG. 4a is 100%. The pulse width modulation level for the pixel shown in FIG. 4b where the number of $\frac{1}{16}^{th}$ pixels is 8 would be 50%. The base duty cycle 50 for FIG. 4b where the number of $\frac{1}{16}^{th}$ pixels is 8 is also 50%. The pulse width modulation level for the pixel shown in FIG. 4c, where the number of $\frac{1}{16}^{th}$ pixels is 8, the TEE count is 2, the TEE time is 1.89 nsec per count, and the pixel time is 567.4 nsec, is 50% plus 1.89 nsec×2/567.4 nsec=50.667%.

A printer with a quantized base duty cycle having $\frac{1}{16}^{th}$ pixel increments may result in slightly more or less exposure at each base duty cycle setting. To account for inaccuracies insetting exposure, densities are printed using different base duty cycles and maximum exposures. Then the equivalent 100% exposure to achieve each measured density is determined using a sensitometric response such as that shown in FIG. 3. Then the equivalent pulse width modulation level is determined by dividing each maximum exposure by its 100% exposure. Lastly a base duty cycle slope (mBaseDC) and pulse width modulation intercept (PWMIntercept) is calculated relating base duty cycles to pulse width modulation levels (PWMLevel). This results in Equation 2.

Equation 2. Calibrated pulse width modulation levels as a function of base duty cycles.

$$PWMLevel = mBaseDC \times BaseDC + PWMIntercept$$

A printer with trailing edge extension counts may result in slightly more or less exposure at each trailing edge extension count setting. To account for inaccuracies in setting exposure, densities are printed using different base duty cycles, TEE counts, and maximum exposures. Then the equivalent 100% exposure to achieve each measured density is determined using a sensitometric response such as that shown in FIG. 3. Then the equivalent pulse width modulation level is determined by dividing each maximum exposure by its 100% exposure. Lastly a base duty cycle slope (mBaseDC), a TEE count slope (mTEECount), and pulse width modulation intercept (PWMIntercept) is calculated relating base duty cycles and TEE counts to pulse width modulation levels (PWMLevel). Equation 3 calculates the calibrated pulse width modulation level as a function of base duty cycle and TEE count.

Equation 3. Calibrated pulse width modulation levels as a function of base duty cycles and TEE Counts.

$$PWMLevel = mBaseDC \times BaseDC + mTEECount \times TEECount + PWMIntercept$$

It is anticipated that if more accuracy in setting exposure is required that more complicated models for calibrating the pulse width modulation level may be created. These models may take into account the color, the drum speed, the power of the exposing device, and the interactions between one or more of the model's factors.

Another problem that may arise with the printer 42 is that when the pixel is turned off for a short amount of time the response may be nonlinear. The maximum exposure is adjusted to compensate for this effect. The off time 54 is calculated using Equation 4. An off time of 0 nsec is obtained at a base duty cycle of 100%. The printer will be linear at 100% duty cycle. An off time less than a lower limit, for example 0 to 45 nsec, may result in the printer barely changing the net exposure for the given pixel.

Equation 4. Calculation of Off Time.

$$Offtime = (1 - PWMLevel) \times PixelTime$$

Given the set of exposures 28 set the maximum exposure level 30 to the maximum of the set of exposures 28. From the maximum exposure level 30 and the printer 42 calculate the drum speed using Equation 5. Calculate the pixel time using Equation 1. Calculate the pulse width modulation levels 40 by dividing the set of exposures 28 by the maximum exposure level 30. For each pulse width modulation level calculate the off time using Equation 4. If there exists an off time less than the lower limit and not equal to zero then set the maximum exposure 30 to the maximum exposure of the set of exposures 28 times the pixel time calculated above divided by the quantity, the pixel time calculated above less the minimum pixel time required.

Drum speed calculation          Equation 5.

$$DrumSpeed = \frac{Power \times WritingResolution}{Circumference \times Exposure}$$

The invention is also the color proof produced by the methods described herein. A color proof is created using this method by imaging multiple bitmaps of each of one or more primary colors in a single pass per primary color. Primary colors may be any of the colors available within the printer including cyan, magenta, yellow, black, orange, green, blue, white, and metallic.

The invention has been described in detail with particular reference to certain preferred embodiments thereof, but it will be understood that variations and modifications can be effected within the scope of the invention.

PARTS LIST

10. Multiple binary bitmaps
10a. Multiple binary bitmap
10b. Multiple binary bitmap
10c. Multiple binary bitmap
10n. Multiple binary bitmap
12a. Original density level
12b. Original density level
12c. Original density level
12n. Original density level
14a. Screen ruling
14b. Screen ruling
14c. Screen ruling
14n. Screen ruling
16a. Screen angle
16b. Screen angle
16c. Screen angle
16n. Screen angle
18. Color
20. "P" bit image
24a. Overprint
26a. Overprint density
26b. Overprint density
26c. Overprint density
28. Set of exposures
30. Maximum exposure level
40. Pulse width modulation levels
42. Printer
44. Proof
46. Pixel time
50. Base duty cycle
52. TEE count
54. "Off" time

What is claimed is:

1. A method for printing multiple binary bitmaps having an original density level and a color, wherein said color is the same for all said multiple binary bitmaps comprising:
  (a) combining "n" number of binary bitmaps into "p" bits of a multibit image forming a "p" bit image;
  (b) identifying at least one overprint;
  (c) predicting an overprint density for each overprint;
  (d) calculating a set of exposures needed to image each overprint density and said original density;
  (e) setting a maximum exposure level which is a number greater than or equal to the maximum of said set of exposures;
  (f) calculating a pulse width modulation level for said set of exposures using said set maximum exposure level; and
  (g) printing said color at said set maximum exposure level using said pulse width modulation level for each level of said "p" bit image in a single pass.

2. The method of claim 1 wherein "p" ranges from two to four.

3. The method of claim 2 wherein if "n" is greater than "p" the method further comprises the step of repeating step (a) through g) until all said multiple binary bitmaps are printed.

4. The method of claim 1 further comprising the step of calculating a base duty cycle and a TEE count for each pulse width modulation level.

5. The method of claim 1 wherein said original density level for each bitmap is a member of the group: one level is different, all levels are different, all levels are the same, a portion of the levels are the same, a portion of the levels are different and combinations thereof.

6. The method of claim 1 wherein said multiple bitmaps comprise a member of the group: images, text, bar codes, and linework.

7. The method of claim 1 further comprising the step of identifying said overprints by identifying that more than one bit of said "p" bit image is on.

8. The method of claim 1 further comprising using a first binary bitmap having a first density level and a second binary bitmap having a second density level, and predicting said overprint density by adding a percentage of said second density level to said first density level.

9. The method of claim 8 wherein said second density level is less dense then said first density level.

10. The method of claim 1 wherein said calculated exposure can be calculated using a curve of density versus exposure.

11. The method of claim 1 wherein said maximum exposure level can range from 50 mJ/cm$^2$ to 1000 mJ/cm$^2$.

12. The method of claim 1 wherein said pulse width modulation level is calculated by dividing each exposure in said set of exposures by set maximum exposure level.

13. The method of claim 1 further comprising the step of setting said maximum exposure level such that none of said exposures are within an "off" time.

14. The method of claim 13 wherein said "off time" is a member of the group consisting of greater than 40 nanoseconds, equal to 40 nanoseconds, and zero.

15. A method for printing multiple binary bitmaps having an original density level and a color, wherein said color is the same for all said multiple binary bitmaps comprising:
   (h) combining "n" number of binary bitmaps into "p" bits of a multibit image forming a "p" bit image;
   (i) calculating a set of exposures needed to image each original density;
   (j) setting a maximum exposure level that is a number greater than or equal to the maximum of said set of exposures;
   (k) calculating a pulse width modulation level for said set of exposures using said set maximum exposure level; and
   (l) printing said color at said set maximum exposure level using said pulse width modulation level for each level of said "p" bit image in a single pass.

16. The method of claim 15 wherein "p" ranges from two to four.

17. The method of claim 16 wherein if "n" is greater than "p" the method further comprises the step of repeating step (a) through (g) until all said multiple binary bitmaps are printed.

18. The method of claim 15 further comprising the step of calculating a base duty cycle and a TEE count for each pulse width modulation level.

19. The method of claim 15 wherein said original density level for each bitmap is a member of the group: one level is different, all levels are different, all levels are the same, a portion of the levels are the same, a portion of the levels are different and combinations thereof.

20. The method of claim 15 wherein said multiple bitmaps comprise a member of the group: images, text, bar codes, and linework.

21. The method of claim 15 further comprising using a first binary bitmap having a first density level and a second binary bitmap having a second density level, and setting a density for said color to said density level which is darkest.

22. The method of claim 15 wherein said calculated exposure can be calculated using a curve of density versus exposure.

23. The method of claim 15 wherein said maximum exposure level can range from 50 mJ/cm$^2$ to 1000 mJ/cm$^2$.

24. The method of claim 15 wherein said pulse width modulation level is calculated by dividing each exposure in said set of exposures by set maximum exposure level.

25. The method of claim 15 further comprising the step of setting said maximum exposure level such that none said exposures are within an "off time."

26. The method of claim 25, wherein the "off time" is a member of the group consisting of greater than 40 nanoseconds, equal to 40 nanoseconds, and zero.

27. A color proof made by the method of claim 15 for each color utilized to make said proof.

* * * * *